United States Patent [19]

Thomas et al.

[11] Patent Number: 5,150,104
[45] Date of Patent: Sep. 22, 1992

[54] ATTITUDE INDICATOR DEVICE UTILIZING CAPACITANCE MEASUREMENT

[75] Inventors: Alexander R. Thomas, 14 Ashcroft Ter., Groveland, Mass. 01834; Anthony S. Pruszenski, Jr., Plum Island, Mass.

[73] Assignee: Alexander Rhys Thomas, Groveland, Mass.

[21] Appl. No.: 665,409

[22] Filed: Mar. 6, 1991

[51] Int. Cl.$^5$ .............................. G08B 21/00
[52] U.S. Cl. ........................ 340/686; 340/573; 340/689; 33/366; 200/DIG. 2; 128/782
[58] Field of Search .............. 340/573, 686, 689, 571; 33/366, 370, 390, 511, 512; 128/782; 200/DIG. 2

[56] References Cited

U.S. PATENT DOCUMENTS

| | | | |
|---|---|---|---|
| 2,713,726 | 7/1955 | Dixson | 33/366 |
| 2,745,091 | 5/1956 | Leffler | 340/689 |
| 3,096,591 | 7/1963 | Higgins, Jr. | 340/870.37 |
| 4,283,798 | 8/1981 | Kuehn | 340/573 |
| 4,422,243 | 12/1983 | Brunson | 33/366 |
| 4,521,973 | 6/1985 | Wiklund | 33/366 |
| 4,651,128 | 3/1987 | Kolb | 340/689 |
| 4,800,542 | 1/1989 | Franklin | 340/689 |
| 4,841,285 | 6/1989 | Laut | 340/571 |

Primary Examiner—Jin F. Ng
Assistant Examiner—Christine K. Oda
Attorney, Agent, or Firm—Wolf, Greenfield & Sacks

[57] ABSTRACT

An attitude sensor device for sensing deviations from a reference orientation which includes a sensor cup having a capacitor and a damped dielectric fluid with a bubble disposed between the electrodes of the capacitor. When the sensor cup is tilted, the bubble is displaced within the damped dielectric fluid and a capacitance change results. A controller circuit detects this capacitance change and outputs a warning signal to an LED and/or a speaker. In an alternate embodiment, the attitude sensor device is mounted to the inner housing of a gyroscope, which is insensitive to movement in two dimensions, thereby allowing the sensing of deviations of rotational movement.

44 Claims, 6 Drawing Sheets

ATTITUDE INDICATOR DEVICE UTILIZING CAPACITANCE MEASUREMENT

BACKGROUND OF THE INVENTION

1. Field of the Invention

The present invention relates to an attitude sensor device for sensing changes in attitude or inclination of a body or mass, and more particularly to an attitude sensor device which utilizes a damped dielectric fluid between electrodes of a capacitor for sensing such changes.

BACKGROUND OF THE INVENTION

It has become increasingly desirable in the field of athletics and physical therapy to train athletes and patients to have proper balance and technique. As such, attitude sensor devices have been designed to train athletes, or anyone needing balance, to hold their bodies in preferred orientations while performing routines. Prior art designs include the use of mercury tilt switches as attitude sensors. Mercury tilt switches utilize liquid mercury to close a circuit during an undesirable tilt in the device (caused by an undesirable movement).

Mercury is not a very viscous liquid, which means that it flows very easily. Therefore, mercury tilt switches act virtually as undamped pendulums, responsive to any slight force Mercury switches are overly sensitive to jerk and impulse movements, as well as accelerations, and will provide false outputs during any vigorous movement. Therefore, mercury tilt switches are limited in use to activities in which there is only slow steady movement. In addition, the mercury liquid, being undamped in nature, will take a fair amount of time to settle. The device will, therefore, be unusable as a sensor during the settling time.

Further, while mercury tilt switches utilize the force of gravity for causing movement in the mercury liquid, thereby creating a signal in a circuit, mercury tilt switches are unusable to detect and measure rotational movement.

Accordingly, it is an object of the present invention to provide an attitude sensor device which does not act as an undamped pendulum, being overly sensitive to jerk and impulse motions.

It is another object of the present invention to provide an attitude sensor device which preferably does not utilize a mercury tilt switch.

It is another object of the present invention to provide an attitude sensor device allowing for vigorous movement without giving false outputs.

It is another object of the present invention to provide an attitude sensor device having a very short settling time for near continuous use as an attitude sensor.

It is another object of the present invention to provide an attitude sensor device which utilizes a damped fluid.

It is another object of the present invention to provide an attitude sensor device which senses rotational movement.

SUMMARY OF THE INVENTION

In accordance with aforementioned objects, there is provided an attitude sensor device for sensing deviations from a reference orientation which comprises a capacitor having two electrodes in spaced relation to one another and a damped dielectric fluid disposed between the electrodes. The damped dielectric fluid has a bubble, of a different dielectric constant and density than the fluid, disposed therein such that the bubble is substantially centrally disposed between the electrodes when the sensor is in the reference orientation. The sensor device further comprises means for detecting a capacitance change when the sensor is altered from the reference orientation and means for outputting a warning signal when the capacitance change is detected. The attitude sensor device further includes a non-conductive sealed enclosure for containing the damped dielectric fluid. In one embodiment of the present invention, the non conductive sealed enclosure is substantially in the shape of a trapezoid. In an alternate embodiment of the present invention, the non-conductive sealed enclosure is substantially in the shape of a cone.

More particularly, in accordance with the present invention, the means for detecting the capacitance change comprises a first oscillator circuit including the capacitor of the sensor device, a second oscillator circuit including a reference capacitor, and means for comparing the output signals of both oscillator circuits. The means for outputting a warning signal includes either a speaker, a light-emitting diode, or both. In one embodiment of the present invention, the sensor device is mounted to a human head piece. Other embodiments of the present invention include strapping the sensor device directly to the human body. The sensor device further includes means for controlling the sensitivity of the device.

In an alternate embodiment of the present invention, the attitude sensor device further comprises recording means for recording the timing of all warning signals and storage means for storing said recording.

In a further alternate embodiment of the present invention, the attitude sensor device is mounted on a gyroscope for sensing movement in one dimension, while ignoring movement in either of the other two dimensions. In this alternate embodiment, the attitude sensor device can sense rotational motion.

BRIEF DESCRIPTION OF THE DRAWINGS

Numerous other objects, features and advantages of the invention should now become apparent upon a reading of the following detailed description taken in conjunction with the accompanying drawings, in which.

DETAILED DESCRIPTION OF THE PREFERRED EMBODIMENT

In accordance with the present invention there is provided an attitude sensor device which utilizes a damped dielectric fluid, and a bubble therein of a different dielectric constant and density than the fluid, between electrodes of a capacitor. When the attitude sensor device is tilted or deviated from a preferred orientation, the bubble within the damped dielectric fluid moves relative to the electrodes, thereby causing a capacitance change. The attitude sensor device further includes a controller circuit which detects any such capacitance change and provides an output warning signal to either or both of an LED and a speaker. The attitude sensor device can be set to any reference orientation and the sensitivity of the device can be adjusted.

Figure 1:
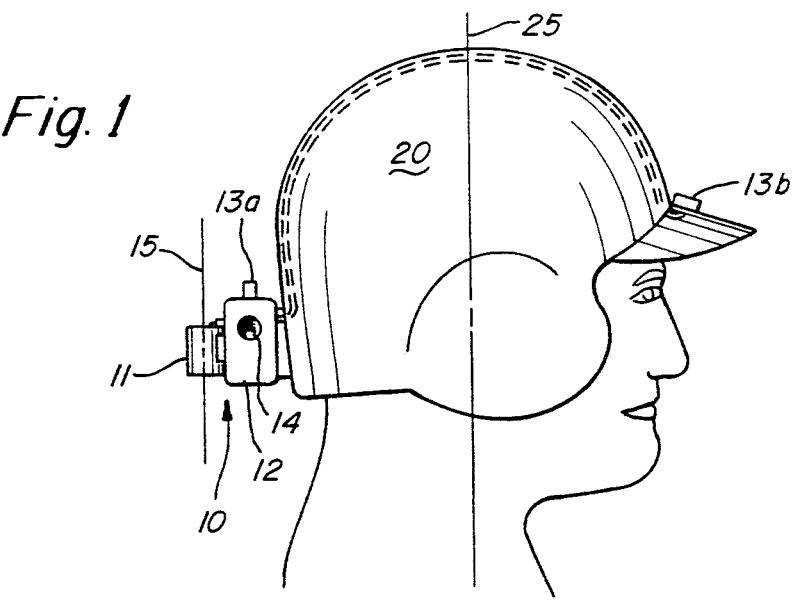
FIG. 1 is a side view of a preferred embodiment of the present invention with the attitude sensor device mounted to a helmet having both audio and visual warning signal capabilities.
Figure 2:
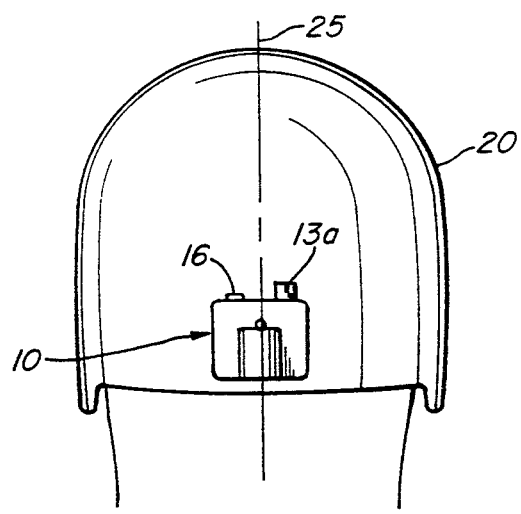
FIG. 2 is rear view of the attitude sensor device of FIG. 1, as mounted to a helmet, illustrating a straight-on view of the attitude sensor device.
Figure 3:
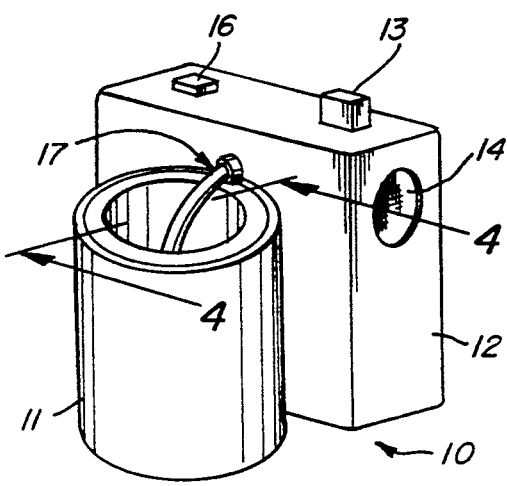
FIG. 3 is a close up view of the attitude sensor device illustrating the sensing device or cup with associated electric pack, and output speaker and LED.
Figure 4:
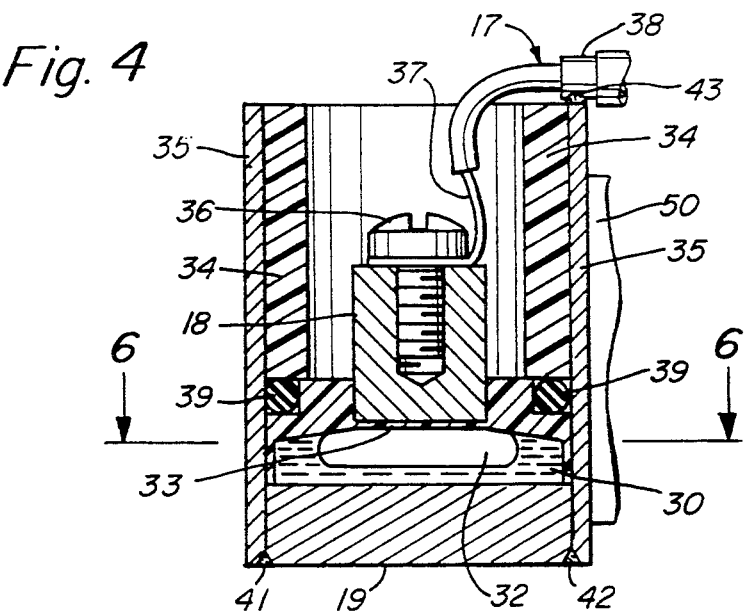
FIG. 4 is a cross sectional view of the sensor cup taken along line 4—4 of FIG. 3, illustrating the internal mechanism of the sensor cup, including the capacitor and damped dielectric fluid.
Figure 5:
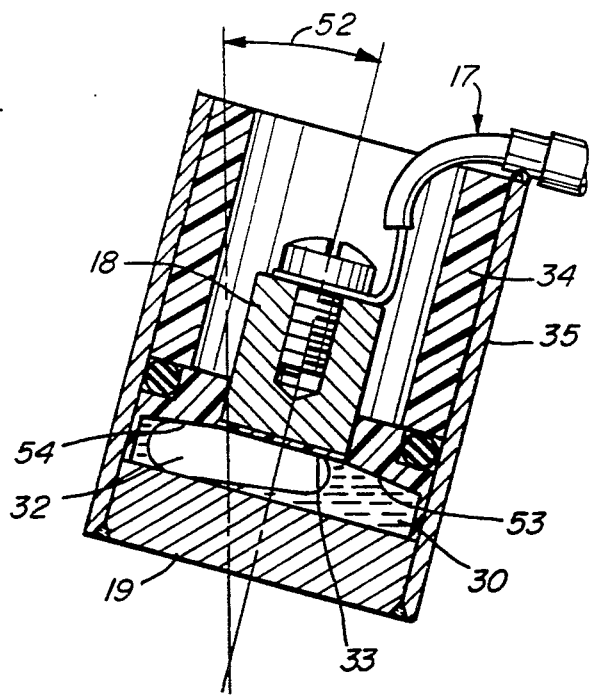
FIG. 5 is the same cross sectional view of the sensor cup as FIG. 4, but tilted from the desired orientation.
Figure 6:
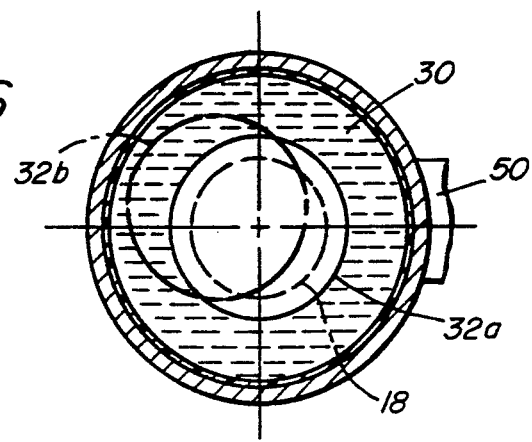
FIG. 6 is a cross-sectional view of the sensor cup, taken along line 6—6 of FIG. 4, illustrating the motion of the bubble within the damped dielectric fluid.
Figure 7:
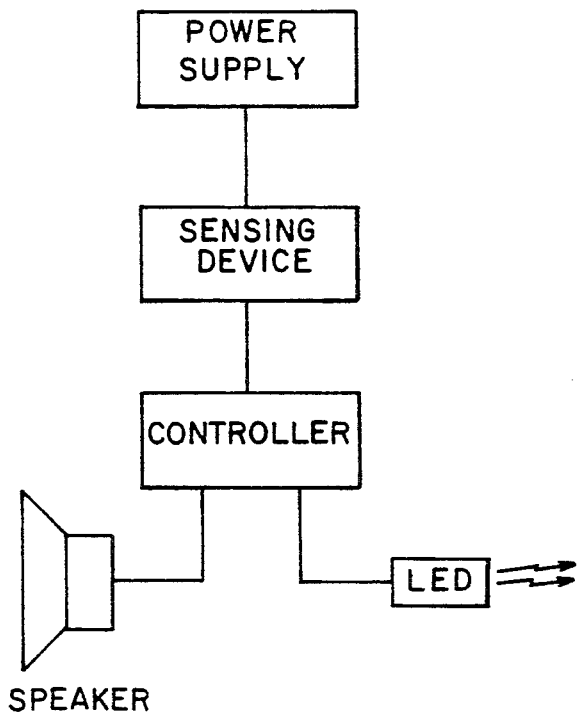
FIG. 7 is a block diagram of the attitude sensor device.
Figure 8:
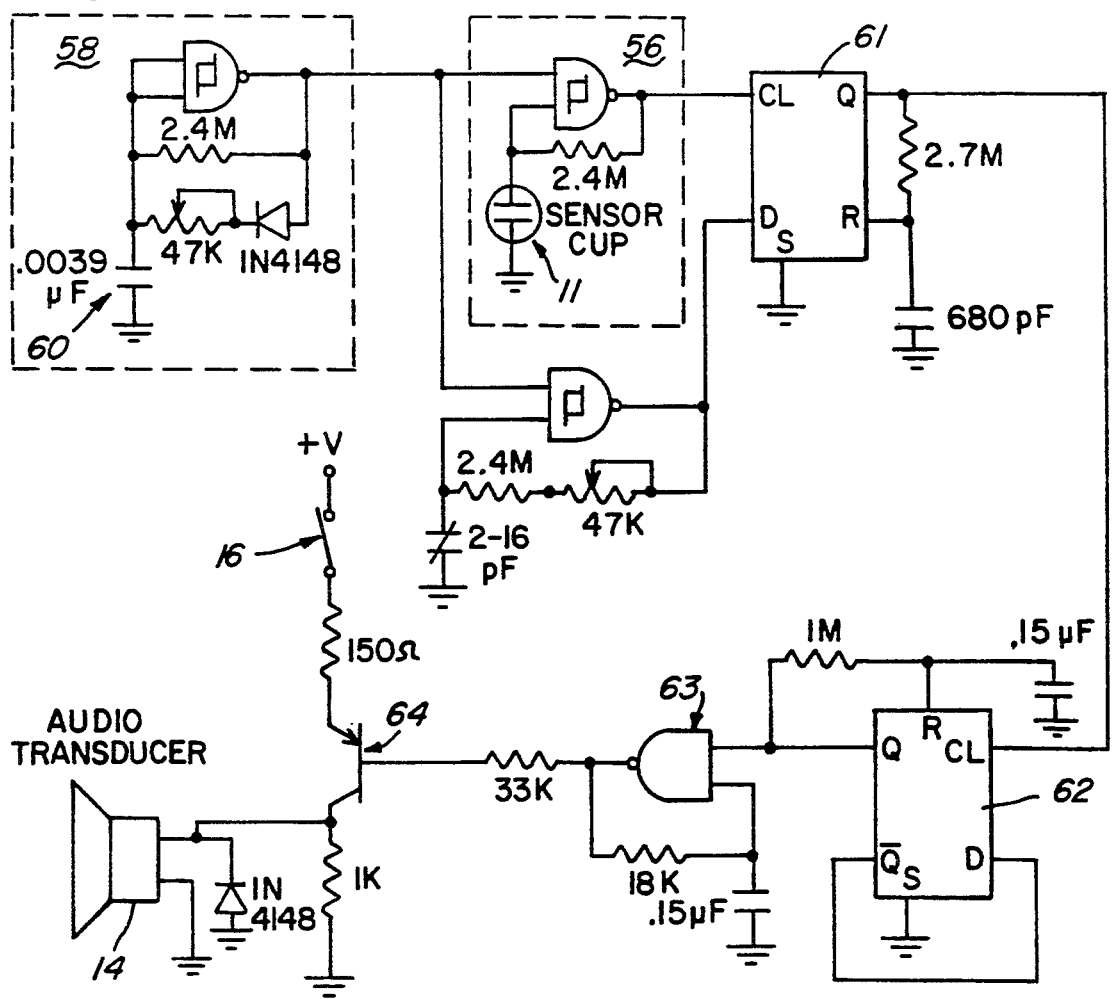
FIG. 8 is the controller circuit of the attitude sensor device.
Figure 9:
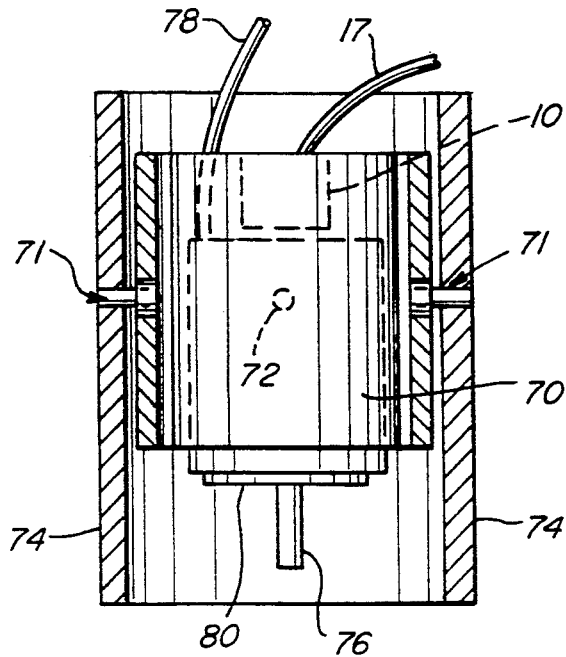
FIG. 9 illustrates an alternate embodiment of the present invention in which the attitude sensor device is mounted to a gyroscope.
Figure 10:
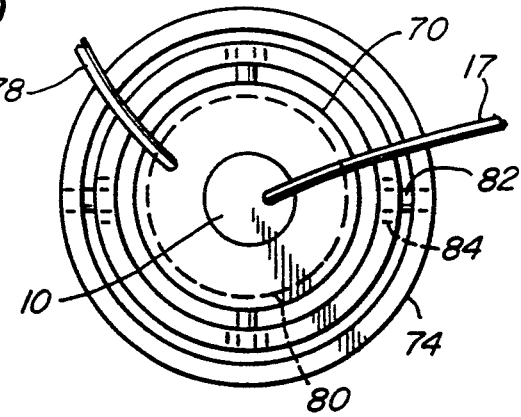
FIG. 10 is a top down view of the alternate embodiment of FIG. 9 in which the attitude sensor device is mounted to a gyroscope.
Figure 11:
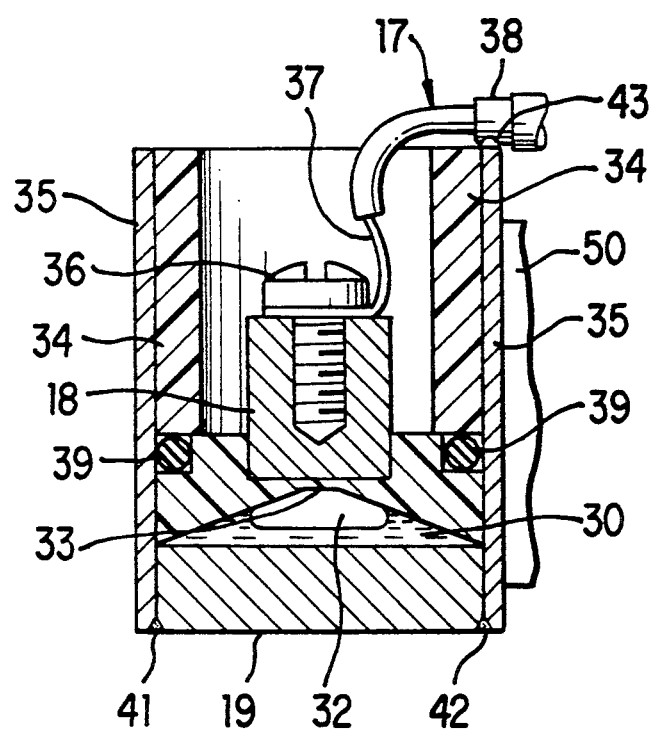
FIG. 11 is a cross-sectional view of the sensor cup taken along line 4—4 of FIG. 3, illustrating the cone-shaped cross section of the sensor cup.
Figure 12:
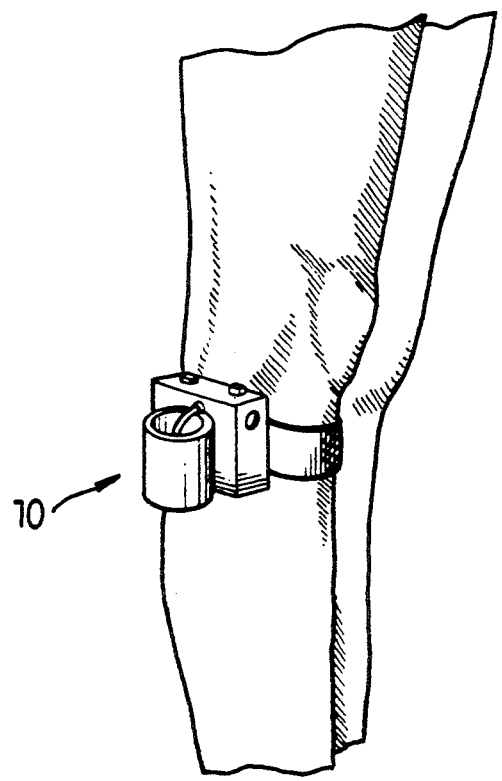
FIG. 12 is a view of an alternate embodiment of the present invention with the attitude sensor device strapped directly to the human body.

Reference is now made to the drawings and in particular to a first embodiment of the invention illustrated in FIGS. 1 and 2, in which the attitude sensor device is mounted to a helmet providing both an audio and visual display for the warning signal. FIG. 3 illustrates a preferred embodiment of the present invention through a close-up view of the attitude sensor device alone with the sensor cup, attached controller box and both audio and visual warning displays. FIGS. 4, 5 and 6 illustrate further details of this embodiment and in particular, through cross-sectional views, illustrate the mechanics and operation of the sensor cup itself with the damped dielectric fluid disposed between the electrodes of the capacitor. FIG. 7 illustrates a block diagram of the component parts of the attitude sensor device while FIG. 8 illustrates the controller circuit of the attitude sensor device. FIGS. 9 and 10 illustrate an alternate embodiment of the present invention in which the attitude sensor device is mounted to a trunnioned gyroscope for sensing rotational movement.

Referring now in particular to FIG. 1, the attitude sensor device 10 is shown mounted to helmet 20 of the person shown. As shown in FIG. 1, the reference orientation is the vertical axis 25 of the head, which is parallel to the vertical axis 15 of the attitude sensor device. When the head is tilted out of vertical alignment, the attitude sensor device 10 will issue warning signals through both the speaker 14 and light emitting diodes (LED's) 13a and 13b. LED 13b is optional but provided in this embodiment to enable human viewing.

FIG. 2 illustrates a rear view of the embodiment of FIG. 1 with the attitude sensor device 10 mounted onto the rear of the helmet 20.

Referring now to FIG. 3 which illustrates a close up view of a preferred embodiment of the present invention, the attitude sensor device 10 is shown with its two component parts, the sensor cup 11 and attached electric pack 12, which houses the controller portion of the device. The attitude sensor device 10 is mounted vertically to an object or human predisposed in the preferred orientation. When the object or human becomes misaligned, so does the attached attitude sensor device 10 and a subsequent warning signal is issued by lighting the LED 13 and issuing a warning sound or buzz through speaker 14. As further seen in FIG. 3, the electric pack 12 also has a power switch 16 for turning on and off the attitude sensor device 10. The device can be battery powered or light powered.

Referring now to FIG. 7, which illustrates a block diagram of the component parts of the attitude sensor device, a general description of the operation of the device follows. The power supply provides power to the attitude sensor device. When the attitude sensor device becomes misaligned due to an undesired movement of the user, the sensing device detects this and sends a signal to the controller, which in turn issues a warning signal to both a speaker and an LED, or one or the other. An optional microcomputer chip can be integrated in the device to record and store the sequence of warning signals issued. In addition, a memory element such as a RAM or other like storage device such as a magnetic tape can be utilized for such purpose. The sensing device component of FIG. 7 refers to the sensor cup 11 of FIG. 3. The sensor cup itself provides an alternate signal when the device becomes misaligned. A description of the sensor cup follows.

Referring now to FIG. 4, which illustrates a cross-sectional view along line 4—4 of FIG. 3 of the sensor cup 11, the sensor cup 11 is shown in its preferred vertical orientation. As seen in FIG. 4, the capacitor with electrodes 18 and 19 is shown. A damped dielectric fluid 30 is disposed between electrodes 18 and 19. Also shown is the outer housing 35 enclosing a plastic cup 34. The upper electrode 18 is a metal post disposed in a bore of the base wall 33 of plastic cup 34. The upper electrode 18 is thus electrically isolated from the damped dielectric fluid 30 by the base wall 3 of the plastic cup 34 disposed therebetween. Within this damp dielectric fluid 30 is a bubble 32 having a different dielectric constant and density than the damped dielectric fluid 30. The damped dielectric fluid is sealed between the trapezoidal shaped base wall 33 of the plastic cup 34 and upper edge of electrode 19. Also shown is a coaxial cable 17 with inner conductor 37 electrically tied to the upper electrode 18 with screw 36, and outer shield 38 electrically tied to the housing 35 with sodder joint 43. In addition, lower conductor 19 is tied to the outer housing 35 and outer shielding 38 of coaxial cable 17 with sodder joints 41 and 42.

The device generally operates by constantly measuring the capacitance across electrodes 18 and 19. When the device is tilted, being misaligned with the reference orientation, the bubble 32 moves relative to the electrodes and is displaced with the damped dielectric fluid 30 of a different dielectric constant, thereby changing the capacitance across electrodes 18 and 19. The capacitance is measured constantly by the controller portion of the device, through the coaxial cable 17. When a capacitance change is detected, a warning signal is issued by the controller portion of the device.

Referring now to FIG. 5, the sensor cup 11 is shown tilted from its reference orientation, with the bubble 32 altered from its central position of FIG. 4. The arrows 52 indicate the angle of misalignment. When this misalignment occurs, the capacitance across electrodes 18 and 19 will be altered. As previously mentioned, this happens because the bubble 32 has a different dielectric constant than the damped dielectric fluid 30. It is important that a damped fluid is used such that the attitude sensor device will be insensitive to jerk and impulse movements, such as sudden accelerations, and will provide accurate outputs during vigorous movement. It is also important to provide a quick settling time, allowing continuous use of the device.

As seen in FIGS. 4 and 5, the bottom base wall 33 of the plastic cup 34 is in a trapezoidal shape with upper angles 53 and 54. This trapezoidal shape is desirable in order that the bubble will not misalign upon a very slight tilt of the sensing cup. Only a significant tilt of the sensor cup will cause the bubble to move past either one of the trapezoidal angles 53 or 54. It is important to note that these angles can be adjusted to adjust the sensitivity of the device.

As is noted from FIGS. 4 and 5, the angles at 53 and 54 are close to but less than 180°. The preferred range of each angle may be 150°–175°. The closer that the angle is to 180° the more sensitive the device is. Also, it is possible to have the angles 53 and 54 different in a particular device if one desires to have the sensitivity different in one direction than the other.

In an alternate embodiment of the present invention, the base wall 33 of the plastic cup 34 can be in the shape of an inverted cone with one central angle or apex which the bubble must overcome during a tilt.

Also shown in FIGS. 4 and 5 are the rubber O-rings 39 which are used to ensure the sealing of the plastic cup 34 such that the damped dielectric fluid 30 will not leak. The coaxial cable 17 provides a constant measuring of the capacitance with the inner conductor 37 electrically tied to the upper electrode 18 and the outer shield 38 electrically tied to the lower conductor 19. Also shown in FIG. 4 is the mounting bracket 50. This is used to mount the sensor cup 11 to the electric pack 12. It can be any of the well known mounting means in the prior art.

As shown in FIG. 6, which illustrates a cross-sectional view along line 6—6 of FIG. 4, the bubble 32a of damped dielectric fluid 30 is centrally disposed below upper electrode 18 while the sensor cup is in vertical alignment. When the sensor cup goes out of vertical alignment, the bubble 32b moves from its centrally disposed position below electrode 18 to the side. Thus, because the dielectric constant of the bubble 32 is different from that of the damped dielectric fluid 30, the capacitance is changed.

As previously mentioned, it is important that the dielectric fluid be of damped type such that it will not be overly sensitive to jerk and impulse movements. In the preferred embodiment of the present invention, the damped dielectric fluid is adjusted to near critical damping by modifying viscosity of the fluid. When mercury is used as the damped dielectric fluid, near critical damping can be achieved by forming a solution of mercury with gallium, indium, bismuth, tin or lead. An amalgam is formed using mercury and adding any one of the aforementioned elements to mercury. The best results are achieved when between 0.05% and 5% additions of any one of the aforementioned elements are provided. Other fluids used as viscosity modifiers, can be alcohols with cabocil. The preferred damped dielectric fluid, with which the best results are obtained, is water mixed with either ethylene or propylene glycol in a preferred ratio of 4:1. This preferred ratio is an optimum mixture for room temperature. It is important that this ratio stay between 10:1 and 1:1. As for the bubble, air is preferred, but any stable gas or immiscible liquid having a different density and dielectric constant (conductivity) than the fluid would work.

Referring now to FIG. 3, the coaxial cable 17 constantly measures the capacitance within the sensor cup 11. When a change in capacitance is detected due to a tilting of the sensor cup, a controller circuit within the electrode pack 12 processes this information and accordingly issues a warning signal through either the LED 13 or the speaker 14, or both.

FIG. 8 illustrates the controller circuit utilized in the present invention. This simple circuit is mounted on a circuit board and located within the electric pack 12. The change in capacitance due to a tilt is monitored by comparing the period of relaxation oscillator 58, using reference capacitor 60, to the period of oscillator 56, using the sensor 11. When the period of oscillation of oscillator 56 increases due to the bubble movement from a tilt, a clock pulse is inputted to the clock input of D flip-flop 61, which in turn outputs a one-shot or impulse of a short time duration. This one shot impulse is then fed through D flip flop 62, nandgate 63 and turns on a transistor 64. Transistor 64 then issues a signal to an audio transducer, thereby outputting a warning signal from speaker 14. As an alternative to speaker 14, or in addition to speaker 14, an LED can be lit when transistor 64 is turned on. Please also note the existence of manual switch 16 such that the user can turn on and off the device.

Figure 13:
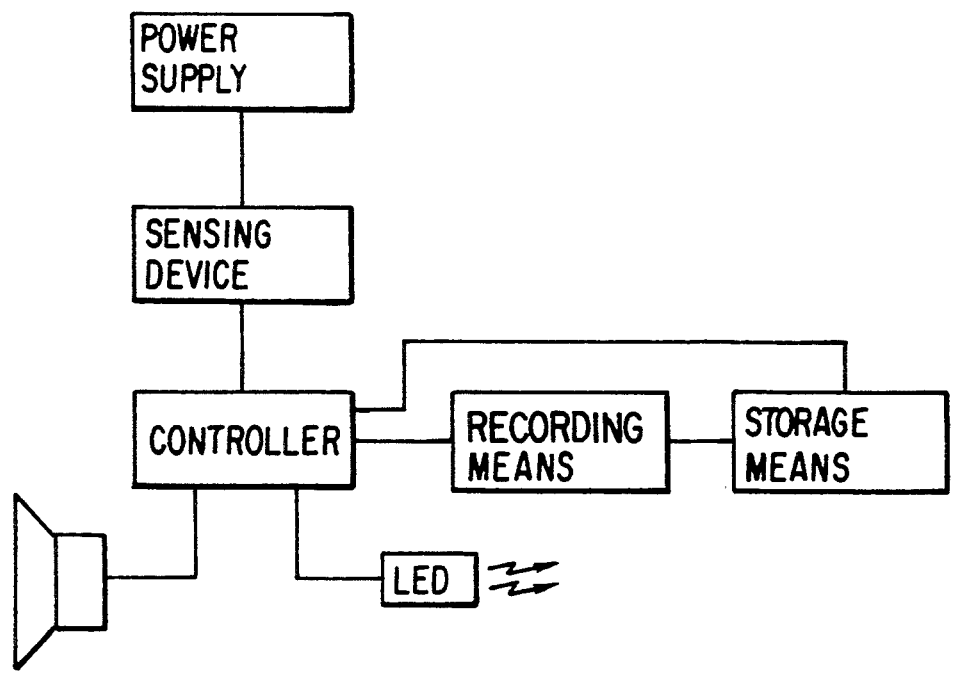
FIG. 13 is a block diagram of the attitude sensor device particularly illustrating the recording and storage means.

A record of the warning signals with the associated timing can be recorded for later analysis. The recording can be made on an audio cassette, a magnetic tape, a video tape, or on any solid state memory device such as a RAM or EPROM. This recording circuitry is shown in the circuit of FIG. 13.

FIG. 9 illustrates an alternate embodiment of the present invention in which the sensor device 10 is mounted to the inner housing 70 of a gyroscope. The attitude sensor device is adequate for use alone when there is moderate motion or moderate horizontal accelerations. For the most active motions, however, it is necessary to use the sensor device along with the gyroscope to differentiate the angular motion from the linear motion. A gyroscope utilizes a spinning wheel possessing inertia, which spins on an axis and resists any change in its direction. The axle of the gyroscope remains pointing in the initial direction to-which it is set because of this phenomenon. The axle of the gyroscope is attached to gimbals having joints at their connections allowing the gyroscope axle and attached inner housing to remain in initial direction or orientation.

As illustrated in FIG. 9, the inner housing 70 of the gyroscope is mounted on two gimbals which are in turn tied to outer housing 74. One trunnion 71 runs left right in FIG. 9 while the other trunnion 72 runs in-out of the page. The outer housing 74 would be mounted to the human or object. If the outer housing is rotated around the trunnioned axis 72 or around trunnioned axis 71, the inner housing 70 would remain in the same orientation, thus leaving the attached attitude sensor device 10 uneffected. If the outer housing 74 is rotated about an axis running up down, such as that of the motor shaft 76, then the inner housing would be rotated due to the absence of a trunnion there. Thus, the attitude sensor device would be activated upon movement of the outer housing 74 in that direction. The trunnions can, therefore, be located such that movement of the outer housing in two dimensions will not affect the attitude sensor device, but movement of the outer housing in a third dimension will affect the attitude sensor device. Thus, rotational movement in a desired dimension will effect the attitude sensor device. It is to be appreciated that these dimensions can be controlled by controlling placement of the trunnions.

The gyrodynamic equations, characteristic of properties of gyroscopes, yield that the spin torque is proportional to a rotation about either of the perpendicular axes. Taking advantage of this property, the rotor torque and spin velocity can be monitored to detect cross-axis rotational velocities.

Within the inner housing 70 of the gyroscope lies a spinning flywheel, necessary in all gyroscopes. The flywheel is spun with a conventional motor. The motor shaft 76 is shown and associated motor control wire 78.

Referring now to FIG. 10, which illustrates a top down view of the gyroscope of FIG. 9, the top of the sensor device 10 can be seen as well as the placement of the motor 80. In addition, pivots 82 are shown where the trunnions contact the outer housing as well as bearings 84, allowing rotational movement.

It is to be appreciated, in accordance with the present invention, that the attitude sensor device is adjustable to be sensitive to certain degrees of tilt and can indicate certain degrees of deviation from the reference point. In addition, the reference orientation can be vertical, horizontal, or some other orientation. It is important, however, that the attitude sensor device 10 be placed vertically on the object or human body with the object or human body predisposed in the reference orientation. Thus, when the attitude sensor device is altered from this reference orientation, the bubble goes out of its central alignment between the electrodes. It is also to be appreciated, in accordance with the present invention, that although shown mounted to a helmet, the device can be used on many different body parts or objects including, but not limited to, the wrist, elbow, shoulder, ankle, back, and hips. In addition, the applications for this attitude sensor device are broad reaching as to the sports or activities that it is helpful with. For examples, it may be useful for tennis, golf, baseball, running, gymnastics, dance, ballet, scuba diving, boxing, physical therapy and any other activity that requires balance.

Having now described a limited number of embodiments of the invention, it should now be apparent to those skilled in the art that numerous other embodiments and modifications thereof are contemplated as falling within the scope of the present invention as defined by the appended claims.

What is claimed is:

1. An attitude sensor device for sensing deviations from a reference orientation, said sensor device comprising:
  a capacitor having two electrodes spaced apart from one another;
  a damped dielectric fluid disposed between said electrodes, said damped dielectric fluid having a bubble of a different dielectric constant and density than said fluid, disposed therein,
  a nonconductive sealed enclosure for containing said damped dielectric fluid, means defining an upper surface of said enclosure and having tapered sides, such that said bubble is substantially centrally disposed between said electrodes when said sensor device is in said reference orientation;
  means for detecting a capacitance change when said sensor device is altered from said reference orientation; and
  means for outputting a warning signal when said capacitance change is detected.

2. An attitude sensor device as set forth in claim 1 wherein one of said two electrodes is disposed within a nonconductive housing, said nonconductive housing being sandwiched between said one electrode and said damped dielectric fluid, thereby electrically isolating said electrode from said damped dielectric fluid.

3. An attitude sensor device as set forth in claim 1 wherein a vertical cross section of said nonconductive sealed enclosure is substantially in the shape of a trapezoid.

4. An attitude sensor device as set forth in claim 1 wherein a vertical cross section of nonconductive sealed enclosure is substantially in the shape of a cone.

5. An attitude sensor device as set forth in claim 1 wherein said means for detecting a capacitance change comprises:
  a first oscillator circuit including said capacitor of said sensor device;
  a second oscillator circuit, being substantially similar to said first oscillator circuit and including a reference capacitor; and
  means for comparing an output signal of said first oscillator circuit with a corresponding output signal of said second oscillator circuit.

6. An attitude sensor device as set forth in claim 1 further including a coaxial cable having an inner conductor electrically connected to one of said electrodes and an outer shield electrically connected to the other of said electrodes.

7. An attitude sensor device as set forth in claim 1 wherein said means for outputting a warning signal includes a speaker and means for driving said speaker.

8. An attitude sensor device as set forth in claim 1 wherein said means for outputting a warning signal includes a light emitting diode.

9. An attitude sensor device as set forth in claim 1 wherein said sensor device is mounted to a human head piece.

10. An attitude sensor device as set forth in claim 1 wherein said sensor device is strapped directly to the human body.

11. An attitude sensor device as set forth in claim 1 wherein the dielectric fluid is a mixture of water and ethylene.

12. An attitude sensor device as set forth in claim 11 wherein said bubble is a stable gas.

13. An attitude sensor device as set forth in claim 12 wherein said bubble is air.

14. An attitude sensor device as set forth in claim 1 wherein the dielectric fluid is a mixture of water and propylene glycol.

15. An attitude sensor device as set forth in claim 14 wherein said bubble is a stable gas.

16. An attitude sensor device as set forth in claim 15 wherein said bubble is air.

17. An attitude sensor device as set forth in claim 1 wherein said bubble is a stable gas.

18. An attitude sensor device as set forth in claim 1 further comprising recording means for recording the timing of all warning signals and storage means for storing said recording.

19. An attitude sensor device as set forth in claim 1 further including means for controlling the sensitivity of said sensor device.

20. An attitude sensor device as set forth in claim 1 wherein said sensor device is mounted on a gyroscope for sensing movement in one dimension while ignoring movement in either of the other two dimensions.

21. An attitude sensor device as set forth in claim 20 wherein said sensor device can sense rotational motion.

22. An attitude sensor device mountable to an object or human for sensing deviations from a reference orientation, said device comprising:
- a capacitor having two electrodes spaced apart from one another;
- a damped dielectric fluid disposed between said electrodes having a bubble therein of a different dielectric constant and density than said fluid, a nonconductive sealed enclosure for containing said damp dielectric fluid, a vertical cross-section of said nonconductive sealed enclosure having an upper surface with tapered sides for reducing the height of said sealed enclosure thereat, wherein the position of said bubble within said fluid is altered upon a deviation of said sensor device from said reference orientation thereby changing the capacitance of said capacitor;
- means for detecting a capacitance change; and
- means for outputting a warning signal when said capacitance change is detected.

23. An attitude sensor device as set forth in claim 22 wherein one of said two electrodes is disposed within a nonconductive housing, said nonconductive housing being sandwiched between said one electrode and said damped dielectric fluid, thereby electrically isolating said one electrode from said damped dielectric fluid.

24. An attitude sensor device as set forth in claim 22 wherein said means for detecting a capacitance change comprises:
- a first oscillator circuit including said capacitor of said sensor device;
- a second oscillator circuit being substantially similar to said first oscillator circuit and including a reference capacitor; and
- means for comparing an output signal of said first oscillator circuit with a corresponding output signal of said second oscillator circuit.

25. An attitude sensor device as set forth in claim 22 further including means for controlling the sensitivity of said sensor device.

26. An attitude sensor device as set forth in claim 22 wherein said sensor device is mounted on a gyroscope for sensing movement in one dimension and ignoring movement in either of the other two dimensions.

27. An attitude sensor device as set forth in claim 26 wherein said sensor device can sense rotational motion.

28. An attitude sensor device for sensing deviations in one dimension from a reference orientation, said device comprising:
- a gyroscope having an outer housing mountable to an object or human and an inner housing spaced apart from said outer housing on a set of substantially perpendicular gimbal mounting means;
- a sensor device being mounted to said inner housing of said gyroscope and comprising:
  - a capacitor having two electrodes spaced apart from one another;
  - a damped dielectric fluid disposed between said electrodes having a bubble therein;
  - a nonconductive sealed enclosure for containing said damp dielectric fluid, means defining an upper surface of said enclosure and having tapered sides, such that said bubble is substantially centrally disposed between said electrodes when said sensor device is in said reference orientation;
- means for detecting a capacitance change; when said sensor device is altered from said reference orientation; and
- means for outputting a warning signal when said capacitance change is detected.

29. An attitude sensor device as set forth in claim 28 wherein said bubble has a different dielectric constant and density than said damped dielectric fluid, and wherein the position of said bubble within said fluid is altered upon a deviation of said sensor device from said reference orientation, thereby changing the capacitance of said capacitor.

30. An attitude sensor device as set forth in claim 28 wherein the orientation of said substantially perpendicular gimbal mounting means are chosen such that said inner housing will maintain its spacial orientation when said outer housing is moved in either of two allowable dimensions and will alter its spacial orientation when said outer housing is moved in the third undesired dimension, thereby triggering the means for detecting of the sensor device.

31. An attitude sensor device as set forth in claim 28 wherein one of said two electrodes is attached to said nonconductive sealed enclosure, said nonconductive sealed enclosure being sandwiched between said one electrode and said damped dielectric fluid, thereby electrically isolating said one electrode from said damped dielectric fluid.

32. An attitude sensor device as set forth in claim 28 wherein said means for detecting a capacitance change comprises:
- a first oscillator circuit including said capacitor of said sensor device;
- a second oscillator circuit, being substantially similar to said first oscillator circuit, and including a reference capacitor; and
- means for comparing an output signal of said first oscillator circuit with a corresponding output signal of said second oscillator circuit.

33. An attitude sensor device as set forth in claim 28 wherein said device is used to detect rotational movement.

34. An attitude sensor device as set forth in claim 28 further comprising recording means for recording the timing of all warning signals, and storage means for storing said recording.

35. An attitude sensor device as set forth in claim 28 further including means for controlling the sensitivity of said attitude sensor device.

36. An attitude sensor device for sensing deviations from a reference orientation, said sensor device comprising:
- a housing having a bottom side;
- a pair of electrodes including an upper electrode and a lower electrode;
- means disposing the lower electrode in a sealed manner at the bottom side of the housing;

an electrically non-conductive support member disposed in said housing above said lower electrode and for supporting said upper electrode;

said support member and said lower electrode defining therebetween a sensing chamber;

a damped dielectric fluid disposed within said sensing chamber, said damped dielectric fluid having a bubble of a different dielectric constant and density than said fluid disposed therein;

means for detecting a change in capacitance between said pair of electrodes; and means for outputting a warning signal upon detecting a predetermined change in capacitance.

37. An attitude sensor device as set forth in claim 36 wherein said housing is an outer housing constructed of metal and including means forming a weld between the base electrode and the housing.

38. An attitude sensor device as set forth in claim 36 wherein said support member is a cup-shaped member having a base wall for supporting said upper electrode.

39. An attitude sensor device as set forth in claim 38 wherein said base wall has a bottom surface, said bottom surface tapers at its periphery to reduce the height of the sensing chamber thereat.

40. An attitude sensor device as set forth in claim 39 wherein said base wall bottom surface has a substantially trapezoidal cross section.

41. An attidue sensor device as set forth in claim 39 wherein said base wall bottom surface has a substantially conical cross section.

42. An attitude sensor device as set forth in claim 39 wherein said cup-shaped support member has O-ring means for sealing said support member.

43. An attitude sensor device as set forth in claim 39 wherein said base wall supports the tope electrode so that the top electrode is oriented in a direction traverse to the bottom surface of the base wall of the cup-shaped support member.

44. An attitude sensor device as set forth in claim 43 including a securing bolt for securing a wire conductor to the top of the top electrode, said securing bolt disposed within said cup-shaped support member.

* * * * *